US 8,026,957 B2

(12) United States Patent
Maeda

(10) Patent No.: US 8,026,957 B2
(45) Date of Patent: Sep. 27, 2011

(54) IMAGE-CAPTURING APPARATUS

(75) Inventor: Hirokazu Maeda, Saitama (JP)

(73) Assignee: Hoya Corporation, Tokyo (JP)

( * ) Notice: Subject to any disclaimer, the term of this patent is extended or adjusted under 35 U.S.C. 154(b) by 450 days.

(21) Appl. No.: 11/751,821

(22) Filed: May 22, 2007

(65) Prior Publication Data

US 2008/0062184 A1    Mar. 13, 2008

(30) Foreign Application Priority Data

May 24, 2006    (JP) .................................. 2006-144517

(51) Int. Cl.
*H04N 5/76* (2006.01)
*G06F 13/00* (2006.01)
*G06F 13/28* (2006.01)

(52) U.S. Cl. ............. 348/231.1; 348/231.99; 348/231.7; 348/231.8; 348/231.9; 711/167

(58) Field of Classification Search .. 348/231.99–231.9; 711/100–173
See application file for complete search history.

(56) References Cited

U.S. PATENT DOCUMENTS

| | | | | |
|---|---|---|---|---|
| 5,018,017 | A * | 5/1991 | Sasaki et al. ................ | 348/231.3 |
| 5,517,241 | A * | 5/1996 | Adachi et al. ............... | 348/231.7 |
| 6,167,498 | A * | 12/2000 | Larson et al. ................. | 711/202 |
| 7,193,648 | B1 | 3/2007 | Sato | |
| 7,406,548 | B2 * | 7/2008 | Owens et al. .................... | 710/60 |
| 7,518,639 | B2 * | 4/2009 | Suzuki ....................... | 348/231.1 |
| 7,583,299 | B2 * | 9/2009 | Kuriyama et al. ....... | 348/231.99 |
| 2003/0185547 | A1 * | 10/2003 | Kikuchi ........................ | 386/117 |
| 2003/0228045 | A1 * | 12/2003 | Asai et al. ..................... | 382/141 |
| 2004/0201749 | A1 * | 10/2004 | Malloy Desormeaux ............ | 348/231.99 |
| 2004/0212693 | A1 * | 10/2004 | Wakabayashi ............. | 348/231.1 |
| 2004/0257463 | A1 * | 12/2004 | Goris et al. .................... | 348/372 |
| 2005/0151859 | A1 * | 7/2005 | Kuriyama et al. ........ | 348/231.99 |
| 2006/0109754 | A1 * | 5/2006 | Iijima ........................ | 369/30.01 |

FOREIGN PATENT DOCUMENTS

| | | |
|---|---|---|
| JP | 5-049000 | 2/1993 |
| JP | 05049000 A * | 2/1993 |
| JP | 2001-352510 | 12/2001 |
| JP | 2003-346418 | 12/2003 |
| JP | 2004-072236 | 3/2004 |
| JP | 2004-153369 | 5/2004 |
| JP | 2004-201226 | 7/2004 |
| JP | 2005-57460 | 3/2005 |

OTHER PUBLICATIONS

English Language Abstract of JP 5-049000.
English Language Abstract of JP 2004-153369.
U.S. Appl. No. 11/751,837 to Yamamoto, filed May 22, 2007.
U.S. Appl. No. 11/741,824 to Maeda, filed Apr. 30, 2007.

(Continued)

*Primary Examiner* — Sinh Tran
*Assistant Examiner* — Christopher K Peterson
(74) *Attorney, Agent, or Firm* — Greenblum & Bernstein, P.L.C.

(57) ABSTRACT

An image-capturing apparatus is provided having a storage control device, a writing speed measuring device, and a selecting device. The storage control device writes image data into memory devices. The writing speed measuring device measures the writing speed of the memory devices by writing dummy data into the memory devices. The selecting device compares the writing speeds of the memory devices, and selects the memory device having the fastest writing speed. The storage control device stores image data in the selected memory device.

19 Claims, 9 Drawing Sheets

OTHER PUBLICATIONS

Japanese Office Action that issued with respect to Japanese Patent Application No. 2006-144517, mailed Oct. 5, 2010, along with an English language translation thereof.

Japan Office action that issued with respect to counterpart Japanese Patent Application No. 2006-144517, dated Jan. 5, 2011 along with an english translation thereof.

* cited by examiner

IMAGE-CAPTURING APPARATUS

BACKGROUND OF THE INVENTION

1. Field of the Invention

The present invention relates to an image-capturing apparatus, in particular to the storage of an image file in a storage medium of the image-capturing apparatus.

2. Description of the Related Art

An image-capturing apparatus, for example a digital camera, processes image data, and stores it in a memory device. Some digital cameras have memory devices, for example, a built-in flash memory and a detachable external memory medium. A detachable external memory medium can be a memory card, for example an SD CARD™, or optical disc, for example a CD-R.

In general, the amount of time required to store image data in a memory device is longer than the amount of time required for imaging and processing. An overly long storage time can cause the processed image data not to be stored. It increases the interval time until the next time that the camera is ready to photograph a photographic subject. In other words, the maximum number of photographs able to be taken per second depends on the writing speed of the memory device.

Some digital cameras are required to photograph a subject, continuously. Continuous photographing demands fast writing speed of the memory device. Fast writing speed increases the maximum number of photographs able to be taken per second.

The writing speed of a memory device is different for different types or generations of memory. Each memory device provided in a digital camera has an attribute, for example the writing speed. A digital camera which increases the number of photographs able to be taken per second by storing the image data in a memory device having an attribute of the fastest writing speed among memory devices is disclosed in Japanese Unexamined Patent Publication (KOKAI) No. (HEI) 5-49000.

However, this attribute indicates the average writing speed of a memory device. The memory area of a memory device fragments into many small areas through the repetition of storing image data. This fragmentation interferes with storage of the image data in a continuous memory area, increases writing time, reduces writing speed, and increases the difference between the actual writing speed and the average writing speed. A digital camera storing image data into a memory device having a slow writing speed due to the average writing speed being different from the actual writing speed, cannot perform to show its potential.

SUMMARY OF THE INVENTION

An object of the present invention is to provide an image-capturing apparatus with a reduced storage time of image data, and increased maximum number of photographs able to be taken per second by choosing an optimum memory device.

According to the present invention, there is provided an image-capturing apparatus comprising a storage control device writing image data in memory devices, a writing speed measuring device measuring writing speed of the memory devices by writing dummy data in the memory devices, a selecting device comparing writing speeds of the memory devices, and selecting the memory device having fastest writing speed, and the storage control device stores image data in the selected memory device.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
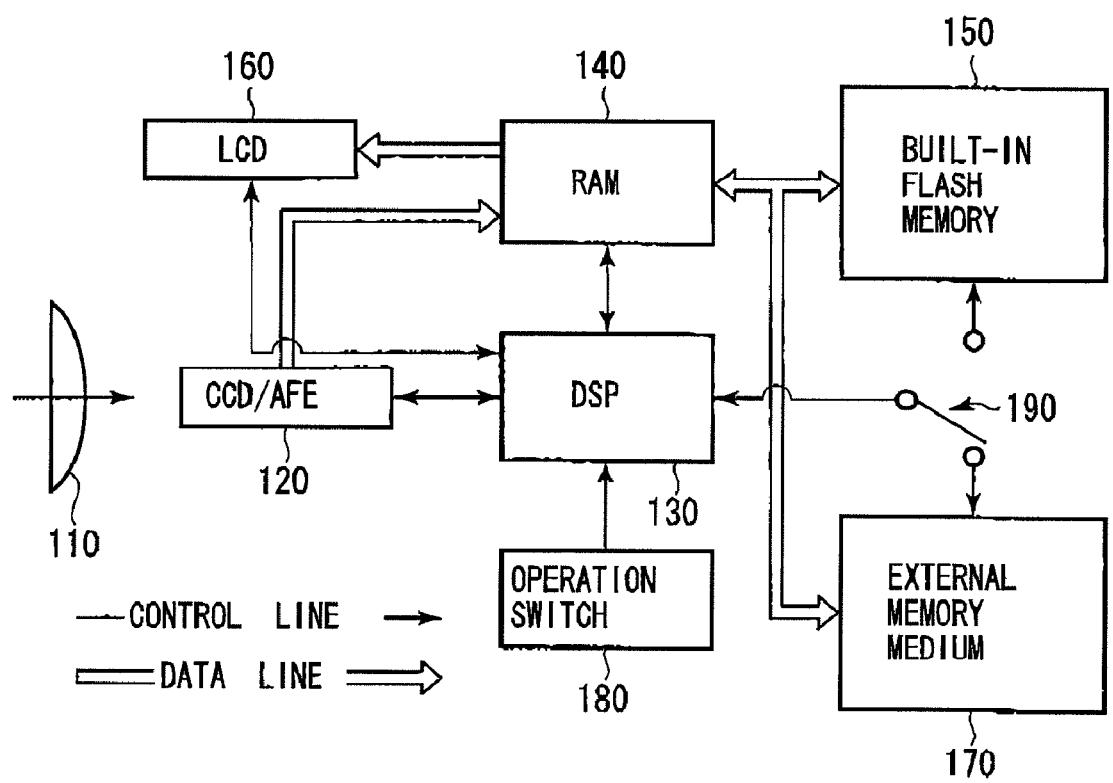
FIG. 1 is a block diagram showing the image-capturing apparatus as an embodiment of the present invention.

The present invention is described below with reference to the embodiments shown in the drawings. FIG. 1 is a block diagram showing a digital camera which has an image-capturing apparatus that applies to the embodiment of the present invention.

A digital camera comprises mainly a CCD/AFE (Analog Front End) 120 which converts an image formed through a lens 110 to a digital signal, a DSP (Digital Signal Processor) 130 which processes the digital signal using a ram 150 that temporarily holds the digital signal, and a built-in flash memory 150 for storing an operation program for the DSP 130. The processed digital signal is stored in an external memory medium 170 which is provided in the digital camera as a removable storage medium, for example an SD card™. Photography information and a photographic image are displayed on an LCD 160. The DSP 130 is connected to a switch for operating the digital camera.

An instruction signal for photography is sent to the DSP 130 by operating a switch 180. A photography subject is focused onto the CCD 120 through the lens 110. The CCD 120 outputs an analog signal to the AFE which converts the analog signal into a digital signal. The digital signal is stored in RAM 140 as image data. These processes are carried out with the CCD/AFE 120 and the operation of the RAM 140 is executed by the control of the DSP 130.

The DSP 130 switches a control line that connects the DSP 130 with the built-in flash memory 150 or the external memory medium 170 using a connection switch 190. In the case that the digital camera is powered on, the DSP 130 is connected to the built-in flash memory 150, and retrieves an operation program from, the built-in flash memory 150. In the case of photographing, image data stored into the RAM 140 is stored in a memory device, i.e. the built-in flash memory 150 or an external memory medium, that is connected to the DSP 130 by operating a connection switch 190.

The data of the image that is captured through the CCD/AFE 120 and is stored in the built-in flash memory 150 or the external memory medium 170, may be displayed on the LCD 160 by operating an operation switch 180. On the screen of the LCD 160, information regarding the operation of the digital camera may also be displayed.

Figure 2:
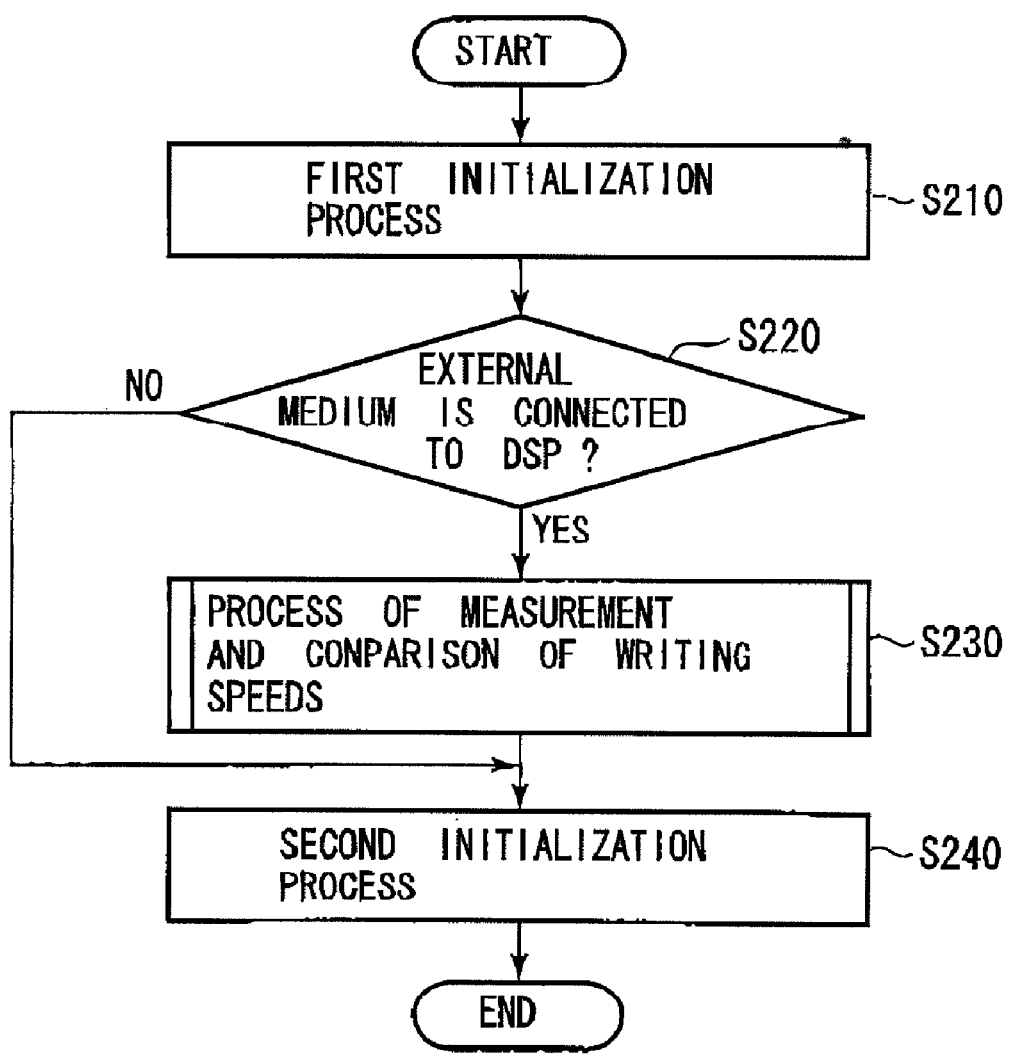
FIG. 2 is a flowchart showing the initialization process.

The initializing process is described below with reference to FIG. 2. The first initialization process is executed in step S210 when the digital camera is powered on by operating the operation switch 180. The first initialization process comprises the movement of the lens 110 into a photographing position, the displaying of a star sign on the LCD 138, the retrieving of user configuration information from the built-in flash memory 150, and the connection of the DSP 130 with the built-in flash memory 150 or the external memory medium 170.

In step S220, it is judged whether the external memory medium is connected to the DSP 130. If it is connected, the process of measurement and comparison of writing speeds is executed in step S230. In the case that an external memory medium is not connected, or step S230 is finished, the second initialization process is executed in step S240. In the second initialization process, a photography subject focused on the CCD is displayed on the LCD 160 in real time, and the DSP 130 enables the operation of the operation switch 180. All initialization processes are finished herewith, and preparation for photographing is finished.

Figure 3:
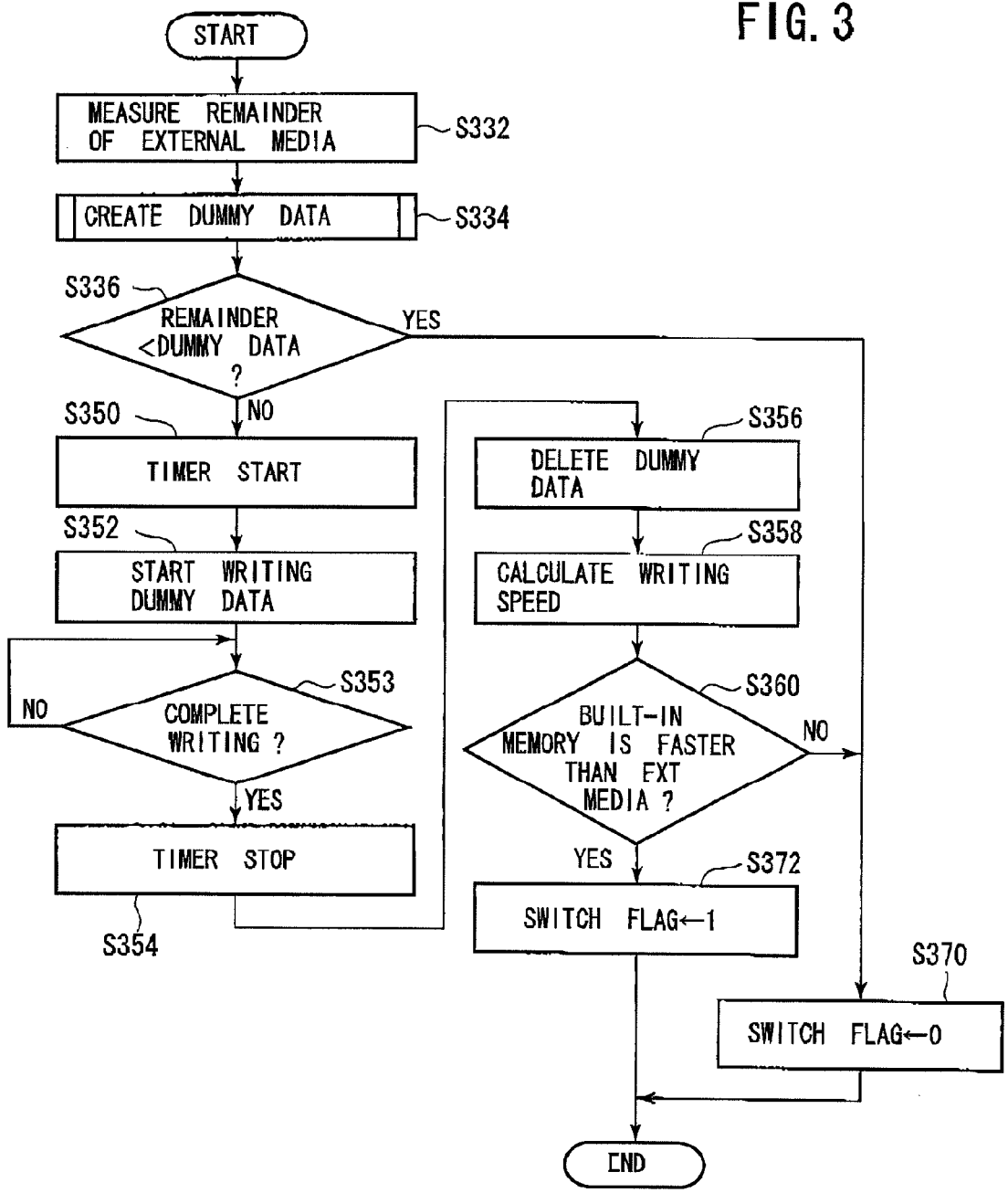
FIG. 3 is a flowchart showing the process of the measurement and comparison of writing speeds.

The process of measurement, and comparison of the writing speeds in step S230 is described below with reference to FIG. 3. The remainder of the external memory medium 170 is measured in step S332, and dummy data is created in step S334. In the next step S336, the remainder of the external memory medium 170 is compared with the file size of the dummy data. In the case that the remainder of storable capacity in the external memory medium 170 is smaller than the file size of the dummy data, the switch flag is set to 0, and the process ends. In the case that the external memory medium has sufficient storable capacity to be write the dummy data, a timer begins to measure the amount of the time it takes to write the data in step S350, and the writing of the dummy data to the external memory medium 170 begins in step S352. In step S353, it is judged whether the writing of the dummy data is completed or not. In the case that writing of the dummy data is completed, the timer stops in step S354. The stored dummy data is deleted from the external memory medium 170 in step S356. In step S358, the writing speed is calculated in step S358 by dividing the file size of the dummy data by the amount of storage time taken.

The comparison of writing speeds is described below. The writing speed, of the built-in flash memory 150 is measured and stored in the DSP 130 in advance. The possibility of fragmentation influencing the writing or retrieving speed of the flash memory 150 is low because the built-in flash memory 150 has a small capacity and low frequency of usage. Therefore, the operating speed of the digital camera is improved by storing the writing speed of the built-in flash memory 150 beforehand. The writing speed of the external memory medium 170 is compared with the writing speed of the built-in flash memory 150 in step S360. In the case that the built-in flash memory 150 is faster, the switch flag is set to 1 in stop S372. In the case that the external memory medium 170 is faster, the switch flag is set to 0 in step S370.

Figure 4:
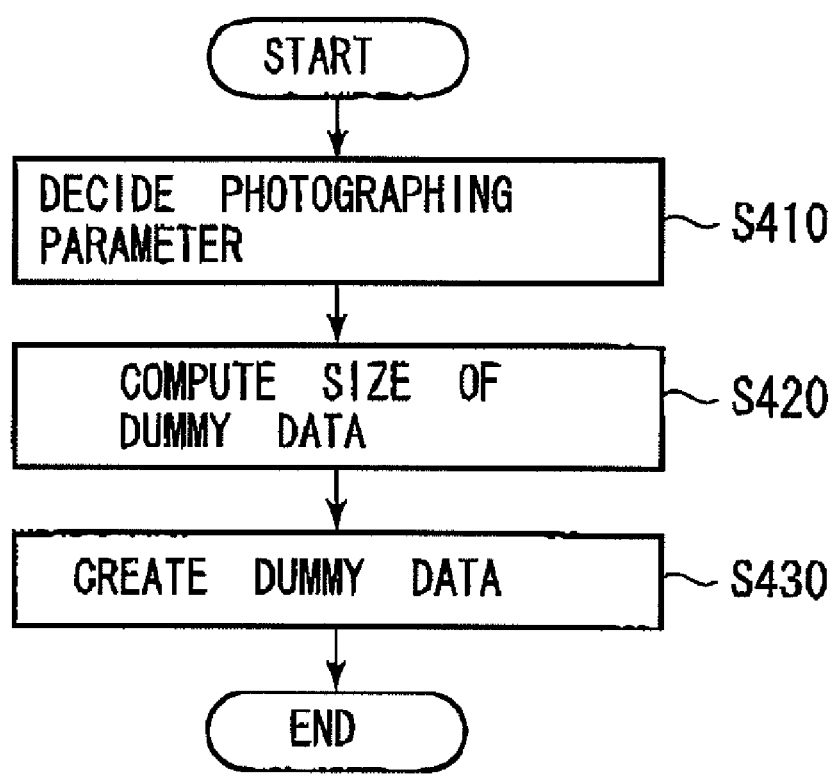
FIG. 4 is a flowchart showing the process of creating dummy data.

The process of creating the dummy data in step S334 is described below with reference to FIG. 4. In the first step S410, a photographing parameter is decided, due to the file size of the dummy data being decided according to a photographing parameter. The photographing parameter is a number of pixels and an image quality. The number of pixels and the image quality is decided by the user using the operation switch 180. According to the image quality, an average parameter is decided. The average parameter is an experimental value, and is calculated by averaging the compression ratio of various images. The file size of the dummy data is equal to the number of pixels multiplied by a certain parameter (for example ⅙), corresponding to a JPEG compression ratio, and divided by a certain parameter corresponding to the image quality set in step S420. After the file size of the dummy data is decided, the dummy data is stored in the RAM 140 in step S430, and then this process is finished.

Figure 5:
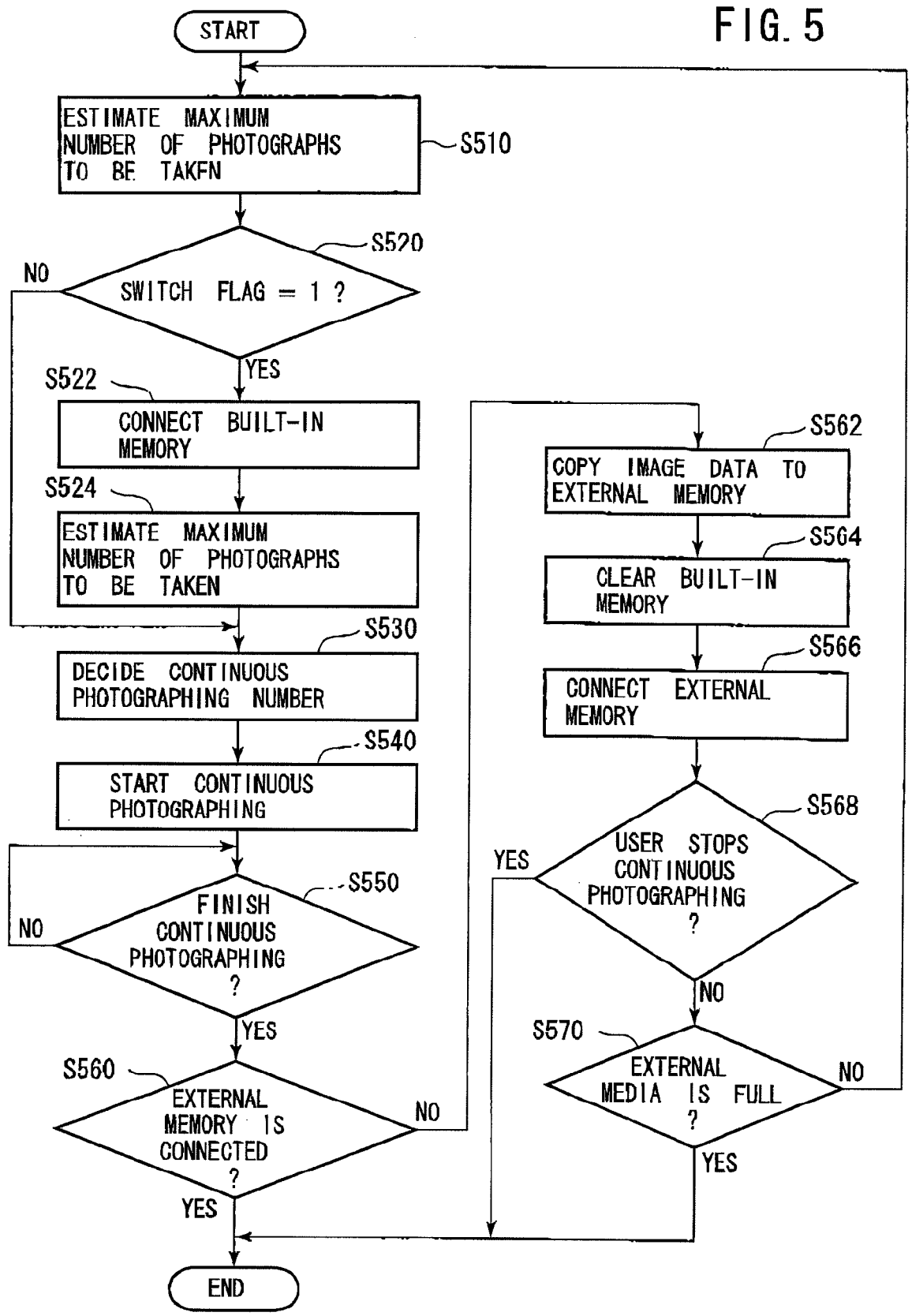
FIG. 5 is a flowchart showing the process of continuous photographing.

The process of continuous photographing is described below with reference to FIG. 5. The initialization process is executed in advance, and the switch flag is set to 0 or 1 in the initialization process. The process of continuous photographing is executed when the digital camera is set to the continuous photographing mode by a user.

The Maximum number of photographs able to be taken is estimated by dividing the remainder of storable capacity in the external memory medium 170 by the predetermined image file size in step S510. The predetermined image file size is decided according to a photographing parameter. It is confirmed that the external memory medium 170 is connected to the DSP 130 and the switch flag is set to 1 in step S520. In the case of these conditions being confirmed, the built-in flash memory 150 is connected to the DSP 130 in step S522, and the maximum number of photographs able to be taken is estimated by dividing the remainder of storable capacity in the built-in flash memory 150 by the predetermined image file size determined according to the photographing parameter in step S524. In the case of these conditions not being met in step S520, step S522 and S524 are skipped.

The continuous photographing number is the maximum possible number of continuously-taken photographs and decided according to a memory device connected to the DSP 130 in step S530. In the case that the built-in flash memory 150 is connected to the DSP 130, the DSP 130 compares the maximum number of photographs able to be taken of the external memory medium 170 with the maximum number of photographs able to be taken of the built-in flash memory 150. The lesser number is set as the continuous photographing number. This prevents the case that image data is not able to be stored in the external memory medium 170 after photographing. In the case that the external memory medium 170 is connected to the DSP 130, the maximum number of photographs able to be taken of the external memory medium 170 is set as the continuous photographing number. This completes the preparation for photographing, and continuous photographing is started in step S540. Image data created by the DSP 130 during continuous photographing is stored in the memory medium that is connected to the DSP 130.

During continuous photographing, it is judged whether the continuous photographing is finished or not in step S550. This judgment is made in the case that the number of photographs taken reaches the continuous photographing number, the remainder of storable capacity in a memory device connected to the DSP 130 runs out, or the user stops the operation. A user can stop continuous photographing by releasing a release switch (not shown), turning off the power of the digital camera, or so on.

When continuous photographing is finished, it is judged whether the external memory medium 170 is connected to the DSP 130 or not. In the case that it is connected, this process is finished in step S560. In the case that the built-in flash memory 150 is connected to the DSP 130, image data is copied from the built-in flash memory 150 to the external memory medium 170 in step S562. The image data stored in the built-in flash memory 150 is deleted in step S564. In step S566, the external memory medium 170 is connected to the DSP 130. It is judged whether the user has stopped continuous photographing in step S568. In the case of continuous photographing being stopped by a user, this process is finished. In the case that continuous photographing is not stopped by a user, it is judged whether the remainder of storable capacity in the external memory medium 170 has run out in step S570. In the case that the remainder of storable capacity in the external memory medium 170 runs out, this process is finished. In the case that the remainder of storable capacity in the external memory medium 170 does not run out, this process restarts from step S510.

According to this embodiment, a digital camera can store image data in a memory device that has the fastest writing speed, and increase the number of photographs able to be taken per second.

Figure 6:
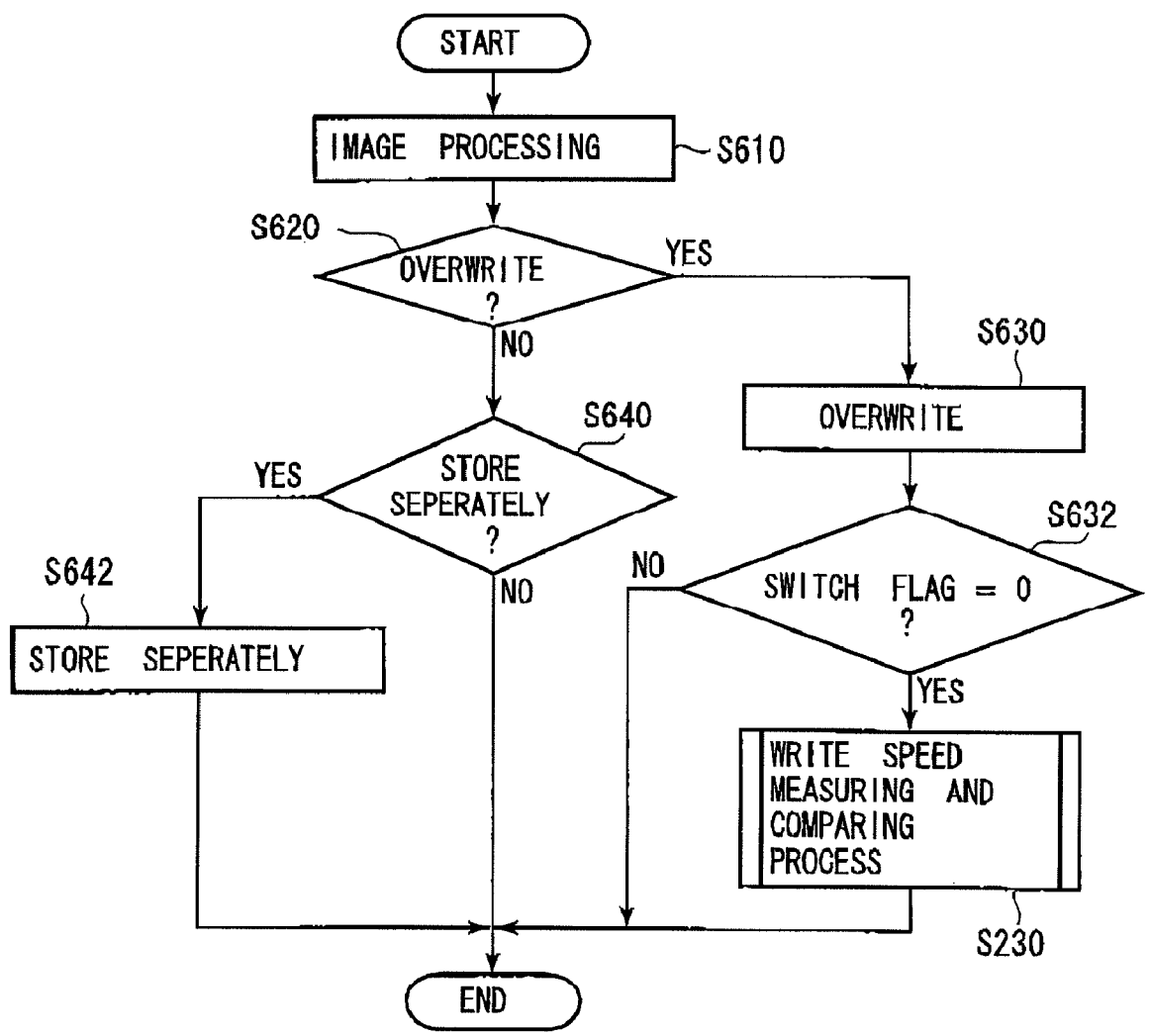
FIG. 6 is a flowchart showing the image processing.

The second embodiment of this invention is described below with reference to FIG. 6. FIG. 6 is a flowchart showing the process of measurement and comparison of writing speeds after image processing.

Some digital cameras have a function to edit image data. Editing image data is done when image data retrieved from the external memory medium 170 is processed by the DSP 130. The image can be resized, trimmed, or filtered herewith. The processed image data is then stored in the external memory medium 170. In many cases, the image data is divided into fragments, and each fragment is stored separately in the external memory medium 170. This causes fragmentation of the memory area. The fragmentation of the memory area decreases the writing speed into the external memory medium 170.

After the operation mode of the digital camera is changed, to the image editing mode by operating an operation switch 160 and image data is edited in step S610, it is selected whether the DSP 130 overwrites the image data with the edited image data or not in step S620. In the case that to overwrite is selected, the DSP 130 overwrites the image data in step S630. The DSP 130 confirms that the switch flag is 0, i.e. the external memory medium 170 is connected, in step S632. In the case that the switch flag is 0, the process of measurement and comparison of writing speeds is executed in step S230. In the case that the switch flag is not 0 in step S632, the process ends.

In the case that to overwrite is not selected in step S620, it is selected whether the edited image data is to be stored separately or not in step S640. If separate storage is selected, the edited image data is stored in a memory device in step S643. If not, the edited image data is deleted in step S640 and the process ends.

Figure 7:
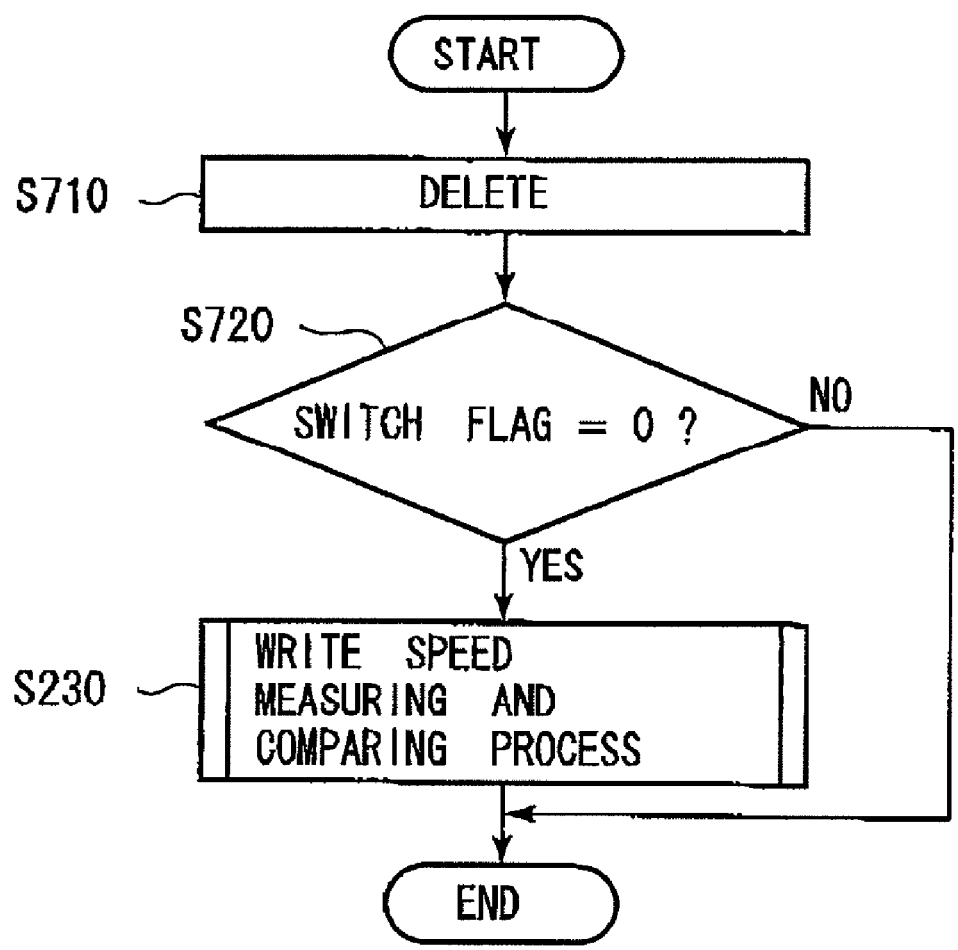
FIG. 7 is a flowchart showing the process of deleting image data stored in the memory device.

The third embodiment of the invention is described below with reference to FIG. 7. FIG. 7 is a flowchart showing the process of deleting image data stored in the memory device.

The DSP 130 can delete image data stored in a memory device. Normally, after image data stored in a memory device is cleared, the memory area which stored the image data is released. The memory area is divided into fragments by repeating this process of clear, consequently the writing speed of the memory device is decreased. However, the process of deleting shown in FIG. 7 prevents a decrease of the writing speed. The image data is deleted by operating the operation switch 180 in step S710. In step S720, it is judged whether the switch flag is 0 or not. In the case that the switch flag is 0, the process of measurement and comparison of writing speeds is executed in step S230. The memory device which has the faster writing speed is selected herewith. In the case that the switch flag is 1 in step S720, i.e. the built-in flash memory 150 is connected to the DSP 130, the process of measurement and comparison of writing speeds is not executed, and the deleting process ends.

According to the second and third embodiments, if the fragmentation of a memory device decreases the writing speed, the amount of time required to store image data can be decreased by selecting a memory device having the faster writing speed.

Figure 8:
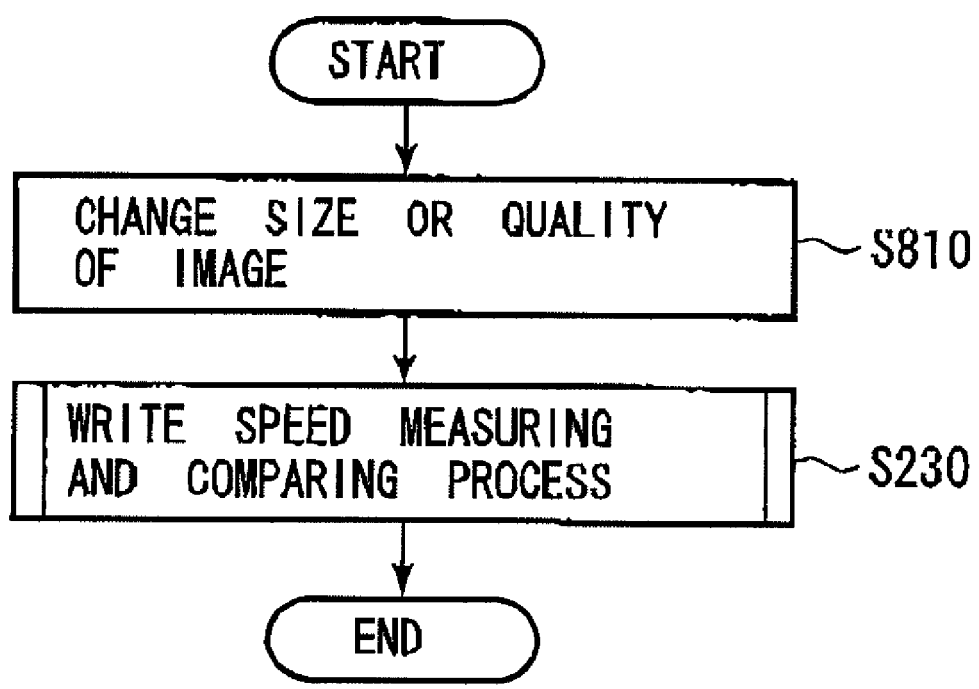
FIG. 8 is a flowchart showing the process of changing photographing parameter.

The fourth embodiment of the invention is described below with reference to FIG. 8.

Some digital cameras have a function that changes the number of pixels in an image and the image quality, for example the image quality is the compression ratio of the image.

When the number of pixels of an image or the image quality is changed, the file size of the data of the image which is photographed is changed. When the file size of the image data is changed, the amount of time required to write the image data into a memory device is changed. Therefore, it is required to select a memory device again by changing the file size of the dummy data used in the process of measurement and comparison of writing speeds. After the photographing parameters are changed in step S810, the process of measurement and comparison of writing speeds is executed in step S230. The memory device having the faster writing speed is selected herewith.

According to this embodiment, even if the file size of the image data is changed, the image data may he stored in a memory device which has a writing speed suited to the file size of the image data. This prevents a decrease of the writing speed, and decreases the amount of time required to store the image data.

Figure 9:
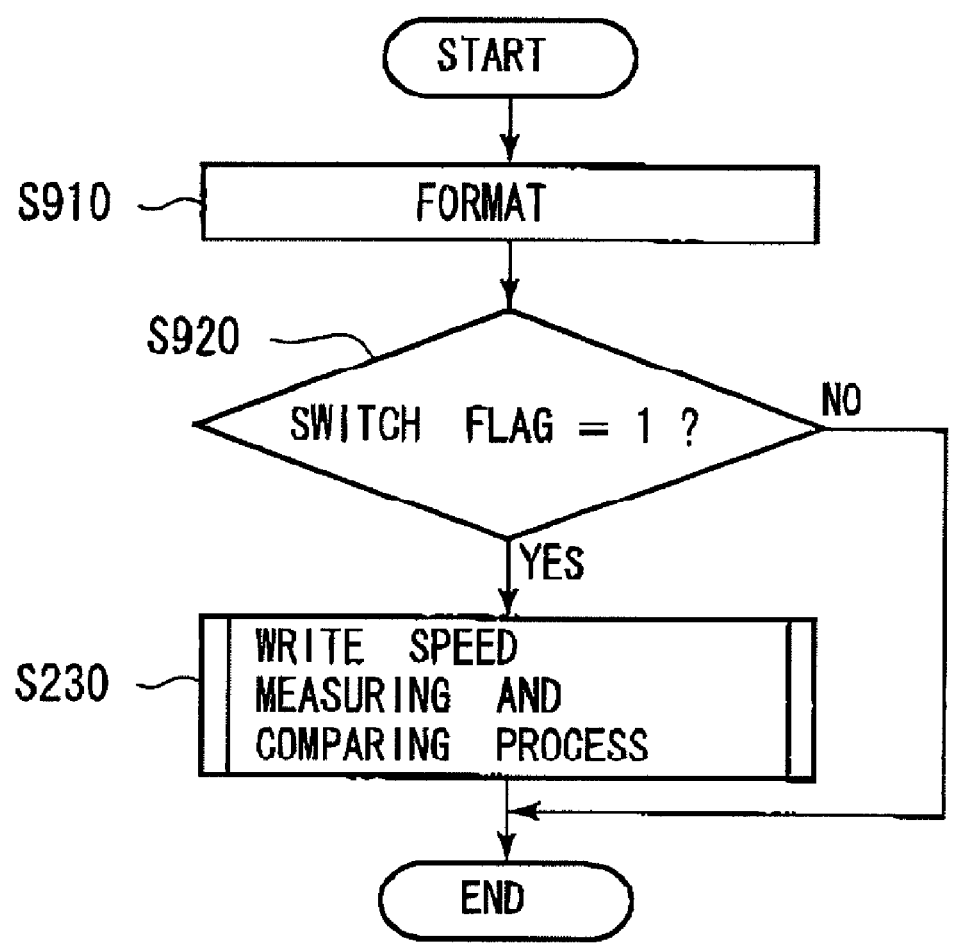
FIG. 9 is a flowchart showing the process of formatting the external memory medium.

The other embodiment of this invention is described below with reference to FIG. 9.

A digital camera may eliminate fragmentation of the external memory medium 170 by formatting, so that the writing speed of the external memory medium 170 is increased. In the case that the external memory medium 170 is formatted in step S910, it is judged whether the switch flag is 1, i.e. the built-in flash memory 150 is connected to a DSP 130, or not. When the built-in flash memory 150 is connected, the process of measurement and comparison of writing speeds is executed in step S230. The process inspects whether the writing speed of the external memory medium 170 has been improved. In the case that the switch flag is not 1, i.e. the external memory medium 170 is connected, the formatting process ends because the writing speed of the external memory medium 170 is faster than that of the built-in flash memory 150.

According to this embodiment, a digital camera increases the writing speed and maximum number of photographs able to be taken per second by connecting the DSP 130 to the faster memory device when an external memory medium is formatted.

Note that, the process of measurement and comparison may be executed after the photographing configuration is changed to continuous photographing mode. The digital camera can decrease the amount of time required to store image data in a memory device.

Note that the writing speed of the built-in flash memory 150 may be measured as well as that of the external memory medium 170. This enables a precise comparison of the writing speeds.

Note that the photographic parameter is not limited to being the number of pixels of an image, or the image quality, but may also be another parameter which changes the file size of an image.

Moreover, the external memory medium 170 is not limited, to being a memory card such as an SD card™, but may also be a storage medium such as an optical disc, a hard disk, or a solid state memory.

Although the embodiment of the present invention has been described herein with reference to the accompanying drawings, obviously many modifications and changes may be made by those skilled in the art without departing from the scope of the invention.

The present disclosure relates to subject matter contained in Japanese Patent Application No. 2006-144517 (filed, on May 24, 2006), which is expressly incorporated herein, by reference, in its entirety.

The invention claimed is:

1. An image-capturing apparatus comprising:
   a storage controller that writes image data into memory devices, at least one of said memory devices being detachable from said image-capturing apparatus;
   a writing speed measurer that measures, without regard to whether writing speed is recorded on at least the detachable one of the memory devices, the writing speed of said memory devices by writing dummy data into said memory devices, said writing speed measurer measuring the writing speed of the detachable memory device;
   a selector that compares the writing speeds of said memory devices, and selects a memory device having the fastest writing speed, said writing speed measurer and said selector being utilized after existing image data in the detachable memory device is overwritten by other image data or after the image data in the detachable memory device is deleted; and
   said storage controller storing image data in the selected memory device.

2. The image-capturing apparatus according to claim 1, wherein a file size of the dummy data is determined from the number of pixels in the data of an image.

3. The image-capturing apparatus according to claim 1, wherein a file size of the dummy data is determined from the compression ratio of the data of an image.

4. The image-capturing apparatus according to claim 1, wherein at least of one said memory devices is a built-in memory device included in said image-capturing apparatus.

5. The image-capturing apparatus according to claim 4, wherein the writing speed of said built-in memory device is measured in advance.

6. The image-capturing apparatus according to claim 4, wherein said storage controller copies image data stored in the built-in memory device to the detachable memory device, and deletes image data stored in the built-in memory device.

7. The image-capturing apparatus according to claim 1, wherein said writing speed measurer and said selector are utilized before continuous photographing.

8. The image-capturing apparatus according to claim 1, wherein said writing speed measurer and selector device are utilized after the number of pixels in the data of an image is changed.

9. The image-capturing apparatus according to claim 1, wherein said writing speed measurer and said selector are utilized after the compression ratio of the data of an image is changed.

10. The image-capturing apparatus according to claim 1, wherein said writing speed measurer and said selector are utilized after the detachable memory device is formatted.

11. The image-capturing apparatus according to claim 1, wherein said storage controller copies image data stored in one of said memory devices to another one of said memory devices which has the slowest writing speed, and deletes image data in said one of said memory devices which has a faster writing speed than the other memory devices.

12. The image capturing apparatus according to claim 1, wherein the file size of the dummy data is determined based on the number of pixels in the data of an image, based upon a parameter related to a compression ratio of the data of an image and based on a parameter related to an image quality.

13. The image capturing apparatus according to claim 1, wherein said selector compares the writing speeds during an initialization of the image capturing apparatus.

14. The image capturing apparatus according to claim 1, wherein when a remainder of a storage capacity of the detachable memory device is smaller than a file size of the dummy data, the writing speed of the detachable memory device is not measured.

15. The image capturing device according to claim 1, said writing speed measurer and said selector being utilized after a determination that the existing image data in the detachable memory device is overwritten by other image data.

16. An image capturing apparatus comprising:
   a storage controller that writes image data into memory devices, at least one of said memory devices being detachable from said image capturing apparatus;
   a writing speed measurer that, without regard to whether a writing speed is recorded on at least the detachable one of the memory devices, measures the writing speed of said memory devices by writing dummy data into said memory devices, a file size of said dummy data being determined in accordance with at least one variable photographing parameter associated with the image capturing apparatus;
   a selector that compares the writing speeds of said memory devices and selects a memory device having the fastest writing speed; and
   said storage controller stores image data in the selected memory device;
   existing image data in the detachable memory device is overwritten by other image data or after the image data in the detachable memory device is deleted.

17. The image capturing apparatus according to claim 16, wherein at least one of said memory devices is a built-in memory device included in the image capturing apparatus.

18. The image capturing apparatus according to claim 17 said storage controller being configured to copy image data stored in the built-in memory device to the detachable memory device and to delete image data stored in the built-in memory device.

19. The image capturing device according to claim 16, said writing speed measurer and said selector being utilized after a determination that the existing image data in the detachable memory device is overwritten by other image data.

* * * * *